United States Patent
Mangwani et al.

(10) Patent No.: US 12,147,403 B2
(45) Date of Patent: Nov. 19, 2024

(54) GENERIC RULES ENGINE

(71) Applicant: Schlumberger Technology Corporation, Sugar Land, TX (US)

(72) Inventors: Vaishali Mangwani, Pune (IN); Mahesh Chandrashekhar Erande, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/688,479

(22) PCT Filed: Sep. 6, 2022

(86) PCT No.: PCT/US2022/042622
§ 371 (c)(1),
(2) Date: Mar. 1, 2024

(87) PCT Pub. No.: WO2023/038891
PCT Pub. Date: Mar. 16, 2023

(65) Prior Publication Data
US 2024/0338349 A1    Oct. 10, 2024

(30) Foreign Application Priority Data
Sep. 8, 2021  (IN) .............................. 202121040825

(51) Int. Cl.
*G06F 16/215* (2019.01)
(52) U.S. Cl.
CPC .................. *G06F 16/215* (2019.01)

(58) Field of Classification Search
CPC ..................................................... G06F 16/215
See application file for complete search history.

(56) References Cited

U.S. PATENT DOCUMENTS

| 9,020,981 B2 | 4/2015 | Morrison |
| 10,693,933 B2 * | 6/2020 | Tucker .................... H04L 51/06 |

(Continued)

FOREIGN PATENT DOCUMENTS

| CN | 105045650 A | 11/2015 |
| CN | 112559606 A | 3/2021 |

OTHER PUBLICATIONS

Search Report and Written Opinion of International Patent Application No. PCT/US2022/042622; Dated Dec. 16, 2022; 7 pages.

*Primary Examiner* — Maher N Algibhah
(74) *Attorney, Agent, or Firm* — Jeffrey D. Frantz (57) ABSTRACT

Methods, computing systems, and computer-readable media for determining whether data conforms to one or more rules. A rules engine executing on a processing device ingests the data during run time. When a structure of the ingested data is unknown, a pre-registered schema corresponding to the structure of the ingested data is obtained from a schema service during the run time. The rules engine generates a rule language file during the runtime based on the preregistered schema and one or more rules. The processing device updates a context of the rules engine based on the generated rule language file making the rules engine capable of running the one or more rules with the structure. The rules engine determines whether the ingested data of the structure conforms to the one or more rules. A data quality score is produced based on the one or more rules to which the ingested data conforms.

16 Claims, 8 Drawing Sheets

(56) References Cited

U.S. PATENT DOCUMENTS

| | | |
|---|---|---|
| 2009/0006448 A1 | 1/2009 | Pall |
| 2011/0078758 A1 | 3/2011 | Kohlenberg |
| 2018/0314853 A1* | 11/2018 | Oliner ................ G06F 21/6254 |
| 2019/0089720 A1* | 3/2019 | Aditham ............. G06F 16/9014 |
| 2019/0342178 A1* | 11/2019 | Balasubramanian .... G06N 5/00 |

* cited by examiner

```
"rules": [
        {
                "name": "Completeness Rule - Well Name is not null",
                "evaluatedEntity": "WellBore",  //rule to be run on wellbore type of data
                "category": "Completeness", // rule type
                "description": "Completeness rule for checking Well Name contains value which is not null",
                "isActive": true, // rule is active or inactive
                "attribute": "Well Name", //rule to be run on which attribute inside data
                "conditions": [
                        {
                                "property": "wellName",
                                "value": null,
                                "operator": "NOT_EQUAL_TO" // should not be null
                        }
                ],
                "action": "1",
                "object": "com.slb.dqmservice.model.WellRecord"
        }
]
```

FIG. 6

```
{
  "data": {
    "classification": "Curated Quality Score",
    "dateCreated": "2019-41-13 07:41:59 +0000",
    "dateModified": "2019-41-13 07:41:59 +0000",
    "description": "Quality score of the entity from Data Quality Management rules engine with predefined system quality rules.",
    "name": "Quality Score",
    "dqmAssessmentRuleResults": [
      "systemdefaultslb510:doc:0b07ad4706aa4a71a3967a892bdf8347",
    ],
    "relationships": {
      "evaluatedEntity": {
        "id": "systemdefaultslb510:wke:well-e396266c-e9eb-4fdb-9ecf-0e8976ecd4b7",
        "version": "1.0.0"
      }
    },
    "score": {
      "unitKey": "%",
      "value": 68.75
    }
  },
  "id": "systemdefaultslb510:doc:046be9cf434346eab37b720571edeb2d",
  "version": 1568360522929919,
  "kind": "systemdefaultslb510:wke:qualityScore:1.0.0",
  "acl": {
    "viewers": [
      "data.rulemanagers.viewers@systemdefaultslb510.delfi.slb.com"
    ],
    "owners": [
      "data.rulemanagers.owners@systemdefaultslb510.delfi.slb.com"
    ]
  },
  "code": 200
}
```

GENERIC RULES ENGINE

CROSS-REFERENCE TO RELATED APPLICATION

This application is a national stage entry under 35 U.S.C. 371 of International Application No. PCT/US2022/042622, entitled "Generic Rules Engine," filed Sep. 6, 2022, which claims the benefit of India application No. 202121040825, entitled "Generic Rules Engine," filed Sep. 8, 2021, the disclosure of which is hereby incorporated herein by reference.

BACKGROUND

Improved data quality provides for better analysis and decision-making. For example, in the oil and gas industry, having improved data quality results in increased efficiency in exploring, developing, and producing large amounts of hydrocarbon resources. Consequently, time and production cost can be reduced when the data quality is improved. However, existing data quality rules engines that determine a precise quality of data based on defined rules must have prior knowledge of a structure of the data. Thus, data quality cannot be measured by the existing data quality rules engines when the structure of the data is not already known to those data quality rules engines.

SUMMARY

Embodiments of the disclosure may provide a method for a rules engine, executing on a processing device, to determine whether data conforms to one or more rules. The rules engine ingests the data during run time. In response to the rules engine determining that a structure of the ingested data is unknown to the rules engine: the rules engine obtains, from a schema service executing on the processing device during the run time, a preregistered schema corresponding to the structure of the ingested data. The rules engine then generates a rule language file during the run time based on the preregistered schema and one or more rules. The processing device updates a context of the rules engine based on the generated rule language file to make the rules engine capable of running the one or more rules with the structure. The rules engine then determines whether the ingested data of the structure conforms to the one or more rules and produces a data quality score based on rules of the one or more rules to which the ingested data conforms.

In an embodiment, the data includes a property of wellName and one of the one or more rules is a user-defined rule that checks for a condition in which a value of the wellName is not equal to a null value.

In an embodiment, the method further includes receiving, by the rules engine, a definition of a rule in a JSON format.

In an embodiment, the obtaining of the preregistered schema, which corresponds to the structure of the ingested data, includes interfacing the schema service, during the run time, with a repository that includes all preregistered schemas in order to obtain the preregistered schema that is unknown to the rules engine.

In an embodiment, the method may further include generating a .java file at the runtime based on the preregistered schema, and generating a class file at the run time based on the .java file, wherein the context of the rules engine is based at least partly on the class file, and the rule language file is based on the structure of the ingested data and the one or more rules defined in a JSON format.

In an embodiment, the method automatically produces the data quality score for each new record ingested into a data ecosystem.

In an embodiment, the method includes storing the data quality score in a data ecosystem. A search application program interface for the data ecosystem is invoked by the rules engine in response to receiving a search query for the quality score. The data quality score and records associated with the search query are received from the data ecosystem in response to invoking the search application program interface.

Embodiments of the disclosure may also provide a computing system that includes at least one processor, and a memory connected with the at least one processor. The memory includes instructions to configure the computing system to perform a number of operations. The operations include a rules engine, executing on the computing system, ingesting data during run time. In response to the rules engine determining that a structure of the ingested data is unknown to the rules engine, a schema service executing on the computing system obtains, during the run time, a preregistered schema corresponding to the structure of the ingested data. The rules engine generates a rule language file during the runtime based on the preregistered schema and one or more rules. The computing system updates a context of the rules engine based on the generated rule language file to make the rules engine capable of running the one or more rules with the structure. According to the operations, the rules engine determines whether the ingested data of the structure conforms to the one or more rules and produces a data quality score based on rules of the one or more rules to which the ingested data conforms.

Embodiments of the disclosure may further provide a non-transitory computer readable storage medium that has instructions stored thereon for configuring a computing device to perform a number of operations. According to the operations, a rules engine executing on the computing device ingests data during run time. In response to the rules engine determining that a structure of the ingested data is unknown to the rules engine, a preregistered schema corresponding to the structure of the ingested data is obtained from a schema service executing on the computing device during the run time. A rule language file is generated by the rules engine during the run time based on the preregistered schema and one or more rules. The processing device updates a context of the rules engine based on the generated rule language file to make the rules engine capable of running the one or more rules with the structure. The rules engine determines whether the ingested data of the structure conforms to the one or more rules and produces a data quality score based on rules of the one or more rules to which the ingested data conforms.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
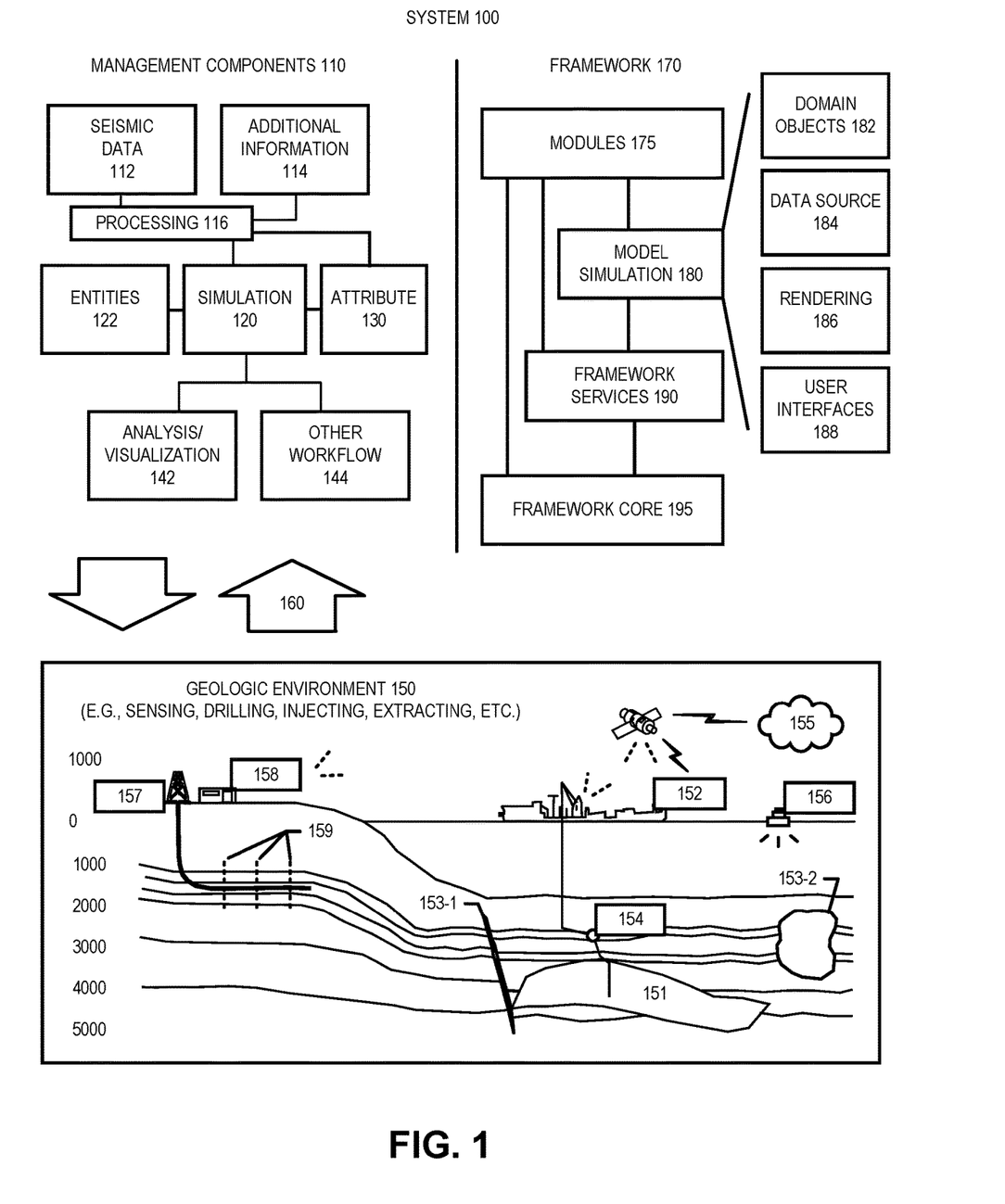
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., via the seismic data component 112 and other information component 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Various embodiments include a generic rules engine, which accepts data and data structure rules as input, processes data, and produces output that includes a quality score based on rules to which the data conforms.

Figure 2:
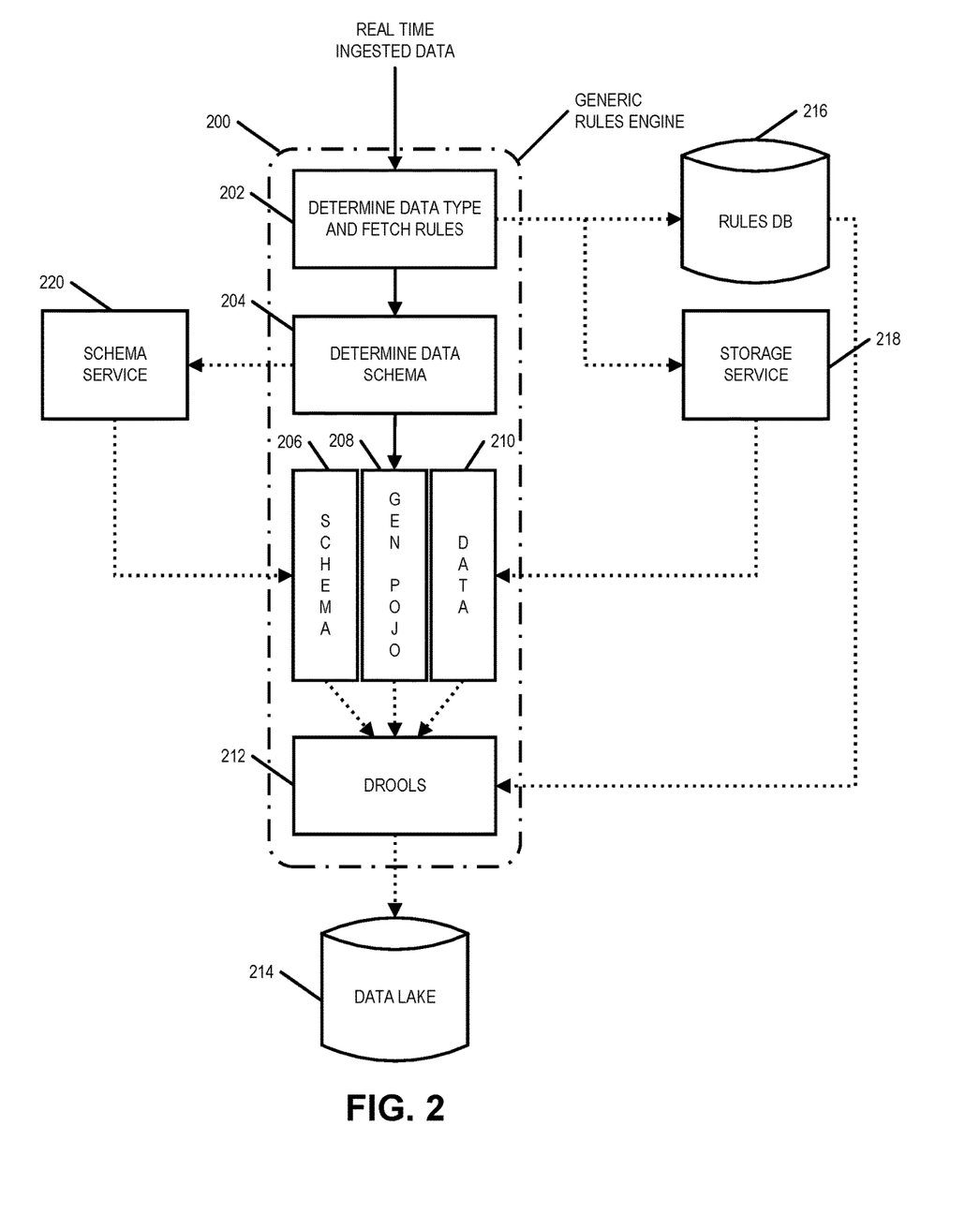
FIG. 2 illustrates an example architecture of a computing system with a generic rules engine according to an embodiment.

FIG. 2 illustrates an architecture of an embodiment of a generic rules engine 200. The generic rules engine 200 includes a first module 202 for determining a data type of real-time ingested data and fetching user-defined rules. The user-defined rules may be stored in a rules database 216, which may be a relational database in some embodiments. The ingested data may be stored in a storage service 218, which may include a non-transitory computer storage medium to which data may be stored and from which data may be retrieved.

A second module 204 determines whether a structure of the ingested data is known to the generic rules engine 200, and if not, the second module 204 interfaces with a schema service 220 during run time, which further interfaces with a repository (not shown) that includes preregistered schemas, also known as structures. A schema 206 that corresponds to a structure of the data may be provided to the generic rules engine 200 from the schema service 220. In some embodiments, the schema 206 then may be used by the generic rules engine 200 to dynamically generate a .java class at run time. A Java 11 container runtime may compile a structure based on the schema 206 to generate a class file at the run time. The structure being compiled may be included in a .java file. In other embodiments, a programming language other than Java may be used.

In some embodiments, it is possible for a schema to be preregistered at run time after the generic rules engine 200 is already processing rules and data. The generic rules engine 200 may run continuously. At a time when the data is pushed on the generic rules engine 200, a schema that is unknown to the generic rules engine 200 and that corresponds to a structure of the data should be preregistered and available to the schema service 220. Otherwise, the generic rules engine 200 cannot apply the rules to the data.

The class file is a structure that Drools 212 recognizes as part of a context. Drools 212 is a Business Rules Management System (BRMS) solution that provides a core Business Rules Engine (BRE) and a web authoring and rules management application. Drools 212 is open source software that is released under the Apache License 2.0 and is written in Java™ (Java is a trademark of Oracle America, Inc., a Delaware Corporation). Java™ runs on any Java virtual machine and is also available in the Maven Central repository.

The generic rules engine 200 generates a .drl (Drools Rule Language) at the run time based on a structure of the data and user-defined rules. A Plain Old Java Object (POJO) class 208 or a .class file, which may be generated by compiling a schema at run time, may define the structure of the ingested data 210. In various embodiments, a .drl file may be dynamically generated for any data structure. In some embodiments, the user-defined rules may be defined in a JSON format.

The generic rules engine 200 may update a Drools context so that Drools 212 becomes capable of running rules with the structure and outputting a data quality score result, which may be stored in a data lake 214.

Although, the above embodiment describes using the schema 206 to generate a .java class at run time, and using a Java 11 container runtime to compile a structure to generate a .class file at the run time, other embodiments may generate a class file using other methods, or may generate a file other than a .class file. Further, a BRMS solution other than Drools 212 may be used in other embodiments. In embodiments that use a different BRMS solution, the generic rules engine 200 may generate a rule language file other than a Drools Rule Language file at the run time based on the structure of the data and user-defined rules.

Figure 3:
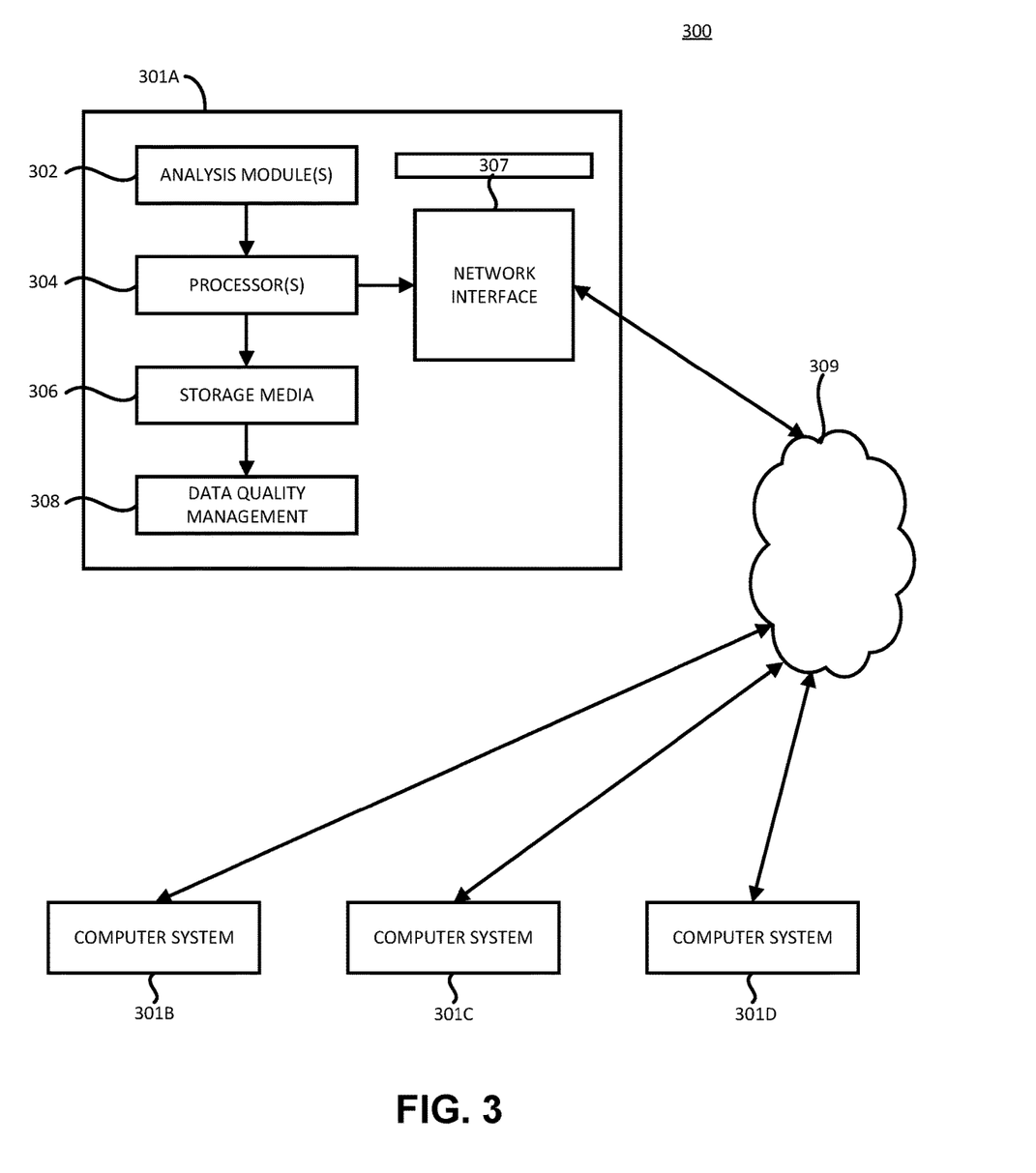
FIG. 3 illustrates a schematic view of a computing system, according to an embodiment.

In some embodiments, the methods of the present disclosure may be executed by a computing system. FIG. 3 illustrates an example of such a computing system 300, in accordance with some embodiments. The computing system 300 may include a computer or computer system 301A, which may be an individual computer system 301A or an arrangement of distributed computer systems. The computer system 301A includes one or more analysis modules 302 that are configured to perform various tasks according to some embodiments, such as one or more methods disclosed herein. To perform these various tasks, the analysis module 302 executes independently, or in coordination with, one or more processors 304, which is (or are) connected to one or more storage media 306. The processor(s) 304 is (or are) also connected to a network interface 307 to allow the computer system 301A to communicate over a data network 309 with one or more additional computer systems and/or computing systems, such as 301B, 301C, and/or 301D (note that computer systems 301B, 301C and/or 301D may or may not share the same architecture as computer system 301A, and may be located in different physical locations, e.g., computer systems 301A and 301B may be located in a processing facility, while in communication with one or more computer systems such as 301C and/or 301D that are located in one or more data centers, and/or located in varying countries on different continents).

A processor may include a microprocessor, microcontroller, processor module or subsystem, programmable integrated circuit, programmable gate array, or another control or computing device.

The storage media 306 may be implemented as one or more computer-readable or machine-readable storage media. Note that while in the example embodiment of FIG. 3 storage media 306 is depicted as within computer system 301A, in some embodiments, storage media 306 may be distributed within and/or across multiple internal and/or external enclosures of computing system 301A and/or additional computing systems. Storage media 306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more data quality management (DQM) module(s) 308. In the example of computing system 300, computer system 501A includes the data quality management module 308. In some embodiments, a single data quality management module may be used to perform some aspects of one or more embodiments of the methods disclosed herein. In other embodiments, a plurality of data quality management modules may be used to perform some aspects of methods herein.

It should be appreciated that computing system 300 is merely one example of a computing system, and that computing system 300 may have more or fewer components than shown, may combine additional components not depicted in the example embodiment of FIG. 3, and/or computing system 300 may have a different configuration or arrangement of the components depicted in FIG. 3. The various components shown in FIG. 3 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Figure 4:
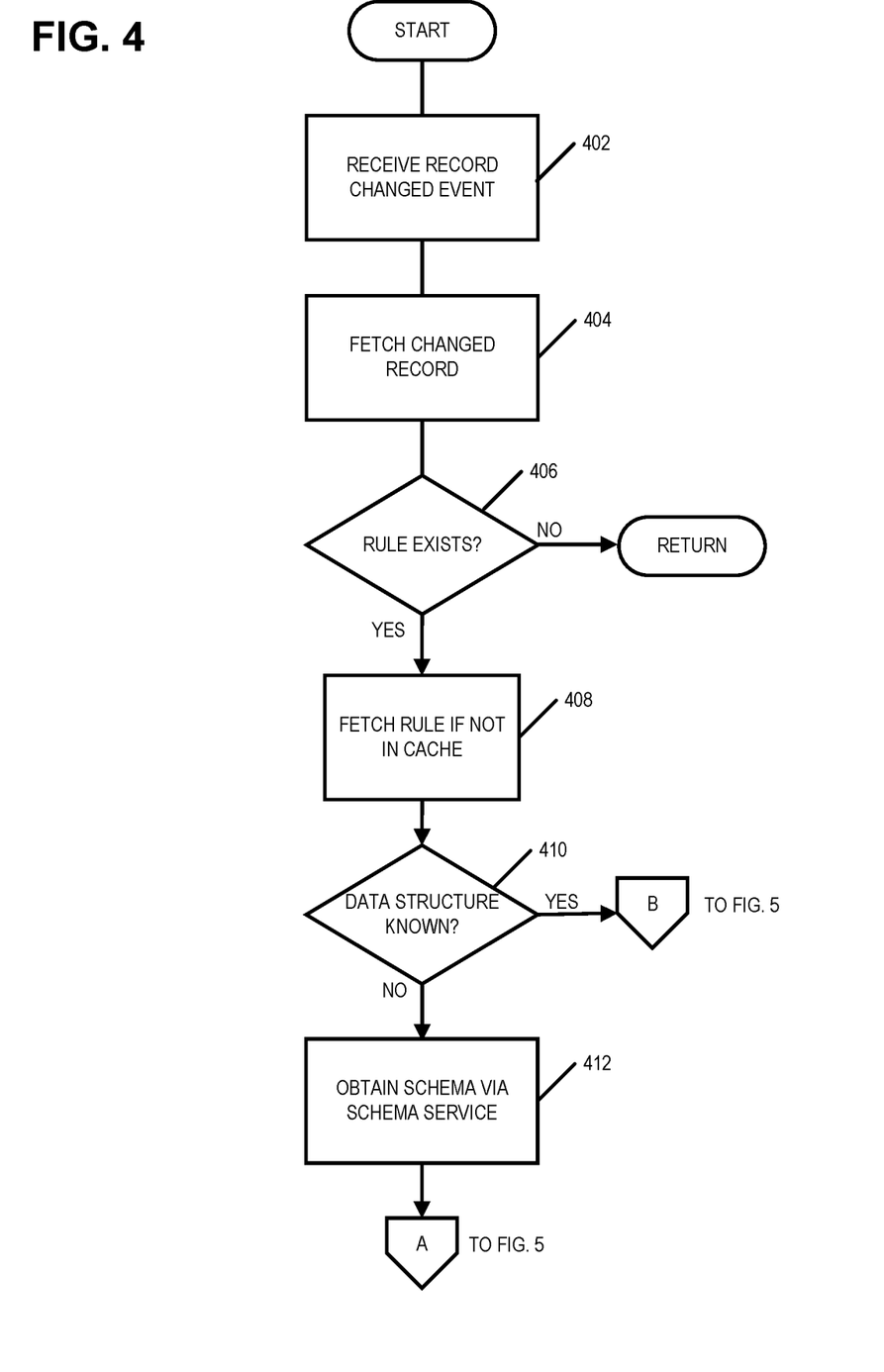
FIGS. 4 and 5 are flowcharts that illustrate example processing for analyzing and scoring data quality according to an embodiment.
Figure 5:
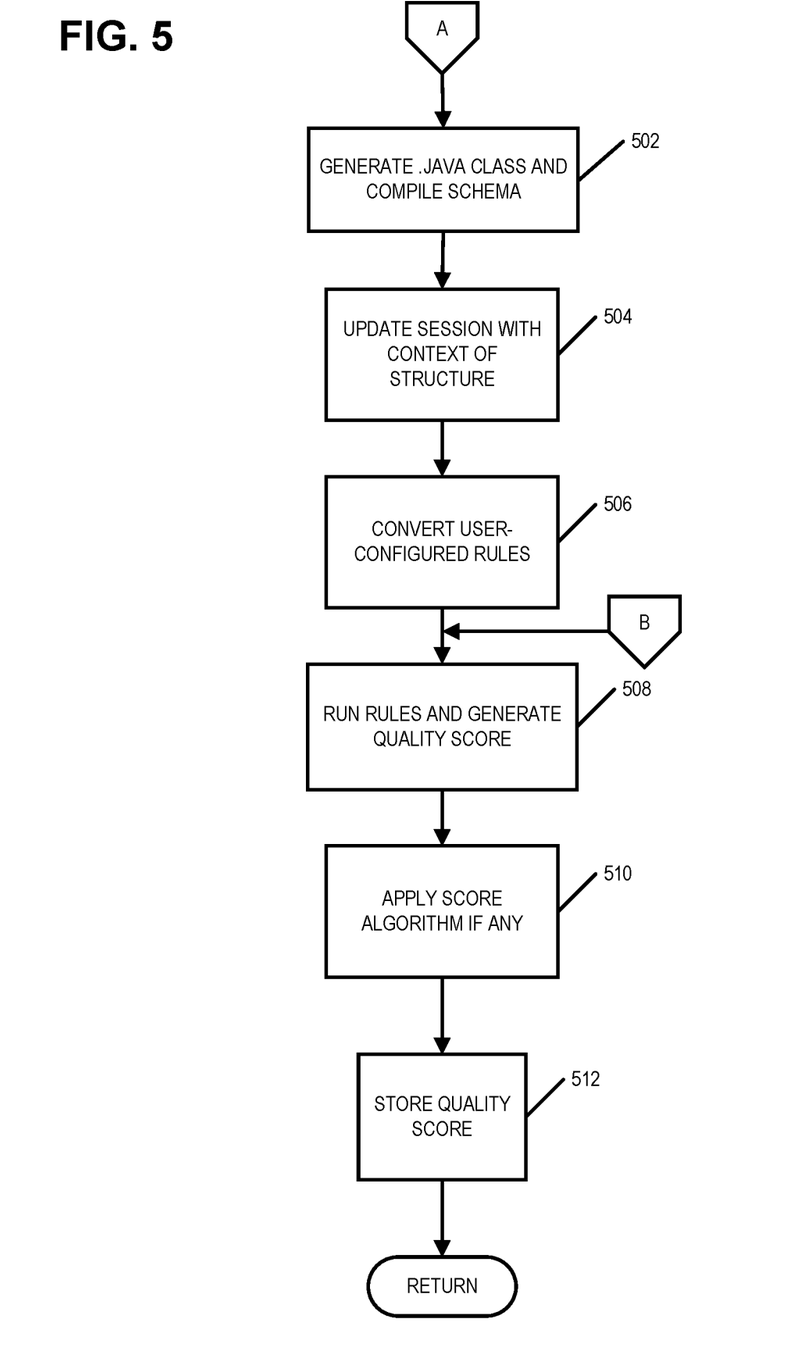

FIGS. 4-5 are flowcharts of a process that may be implemented in a computing system to process a record change event in various embodiments. The process may begin with the generic rules engine 200 receiving a record changed event from a data ecosystem (act 402). The generic rules engine 200 then may fetch the record that was just changed from storage service 218 (act 404) and may determine whether any rules exist regarding the changed record (act 406). If no rules exist, then processing by the generic rules engine for this record may end. Otherwise, if the rule(s) is/are not in a cache, the rule(s) may be fetched from rules database 216 (act 408).

Next, the generic rules engine 200 may determine whether a data structure of the changed record is known to the generic rules engine 200 (act 410). If the data structure is not known to the generic rules engine 200, then the generic rules engine 200 may obtain a pre-registered schema corresponding to the structure of the changed record via the schema service 220 (act 412). The generic rules engine 200 may use the schema to dynamically generate a .java class at run time, and in some embodiments, a Java 11 container runtime may compile the structure (.java file) that corresponds to the schema to generate a .class file at the run time (act 502; FIG. 5). Drools 212 may use the class file to update a Drools session with a context of the structure (act 504). The generic rules engine 200 then may convert user-defined rules associated with the structure to a rules language for Drools 212 (act 506). The rules then may be run against the data in the structure and a data quality score may be generated (act 508). The data quality score is a value that is related to rules applied to the data to which the data complies. In some embodiments, a data quality score may comprise a combination of multiple other data quality scores, some of which may be weighted differently from others of the other data quality scores. If a scoring algorithm exists for calculating the data quality score from the combination of multiple other data scores, then the scoring algorithm may be applied to produce the combined data quality score (act 510). The data quality score then may be stored in a data lake 214 (act 512). The process then may be completed.

A user-defined rule effectively has a format of:
when <condition> then <action>
That is, when evaluated data satisfies a condition, then an action is performed.

Figure 6:
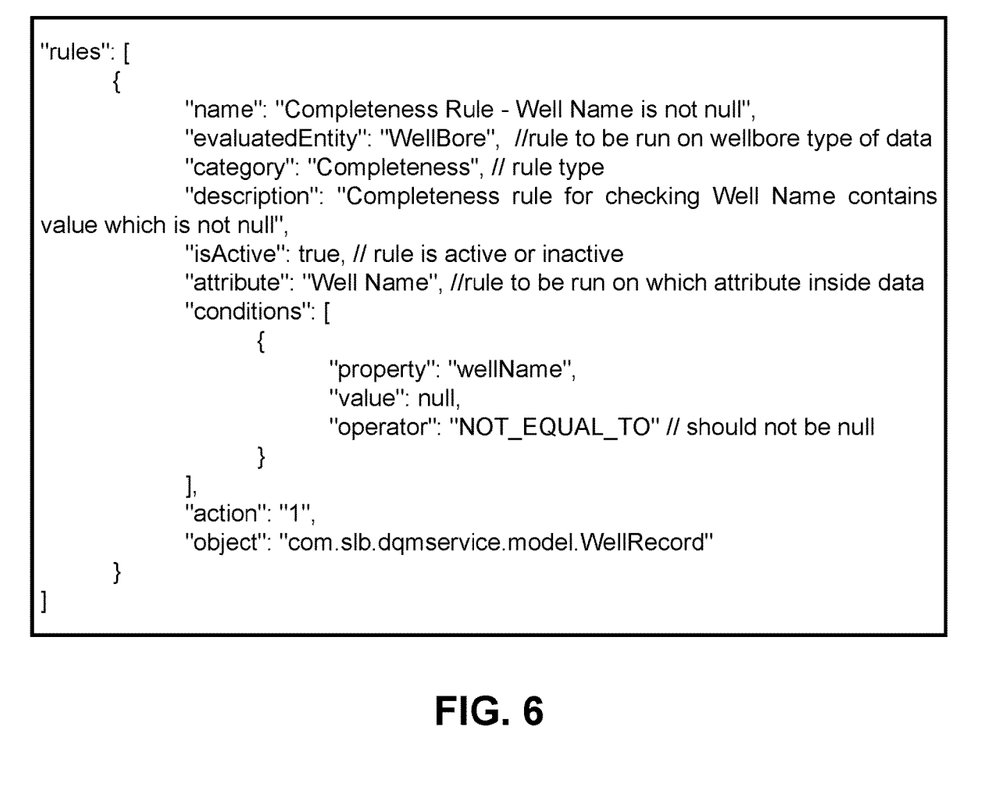
FIG. 6 shows an example user-defined rule written in a JSON format according to an embodiment.

FIG. 6 shows an example user-defined rule in a JSON format. In other embodiments, user-defined rules may be in a different format. The name of the rule is "Completeness Rule—Well Name is not null". "evaluatedEntity" is "WellBore", which indicates that the rule is to be run on wellbore type data. The category, or rule type, is "Completeness" and the rule is active. The attribute on which the rule is to be run is "Well Name". The condition to be checked is whether the property "wellName" in a well record is not equal to a value of null. If the data meets this condition, then an attribute "action" is set to 1. "object" is a POJO, which is data having a structure defined by "com.slb.dgmservice.model.WellRecord".

Figure 7:
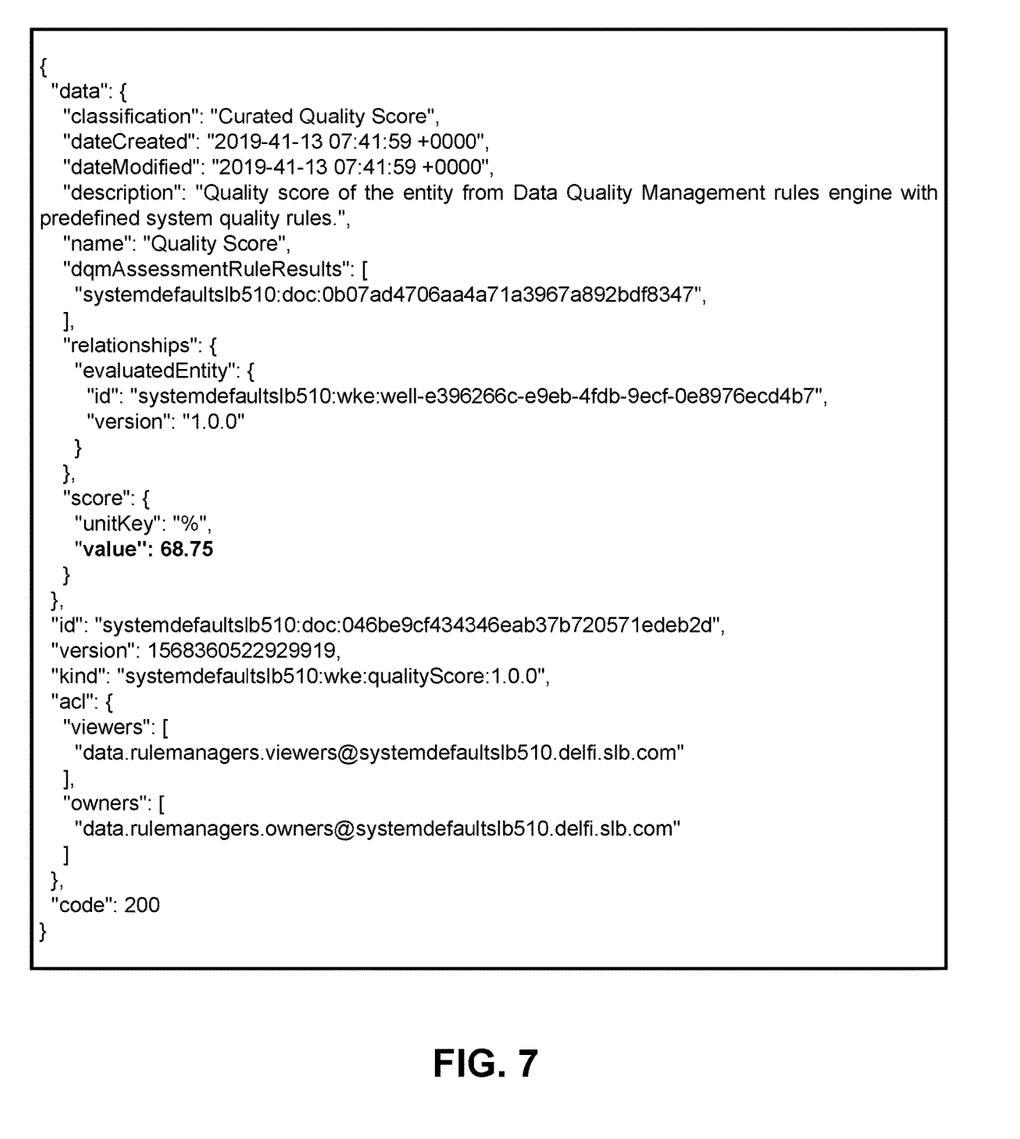
FIG. 7 shows an example schema, or structure, of an output data quality score according to an embodiment.

As soon as data is ingested, the generic rules engine 200 obtains any associated user-defined rules and associated data structures and produces a quality score with a detailed description. FIG. 7 shows an example output that may be presented as a result of producing the data quality score.

As shown in FIG. 7, "classification" indicates what the data is. In this example, the data is "Curated Quality Score". "dateCreated" and "dateModified" are timestamps, which indicate when the quality score was analyzed.

"description" is a description of the output, which in this example is "Quality score of the entity from Data Quality Management rules engine with predefined system quality rules".

"name" is "Quality Score", which is a name of the output.

"dgmAssessmentRuleResults" defines a unique ID of a single rule result. This is useful if a user wants to view the specific rule conditions that were met to produce this particular quality score. Using this unique identifier, rule information and a result may be obtained and presented to a user.

"id", defined under "evaluatedEntity", indicates a unique data record ID, which was read from a database, and on which the data quality rule was run.

"unitKey", which is defined under "score", defines how a score is measured. In this example, the score is measured as a percentage, but could be measured in a number of different ways including, but not limited to, six sigma and a point scale.

"value" indicates a data quality score value. In this example, "value" is 68.75%.

Next, "id" is a unique identifier of this quality score. "version", which follows "id", is a version of the quality score. The same rules may be executed at different times on the same record. Therefore, the quality score may change because the record may have undergone a data change. If this is the case, the quality scores of the same record may be differentiated by "version".

"viewers" and "owners", respectively, are access control lists of users permitted to view the data quality score output and users who have owner access to modify and delete the data quality score output record.

In some embodiments, the generic rules engine 200 may be integrated as a web service. ""code": 200" signifies an HTTP service call in which processing of the data quality rule is successful.

Figure 8:
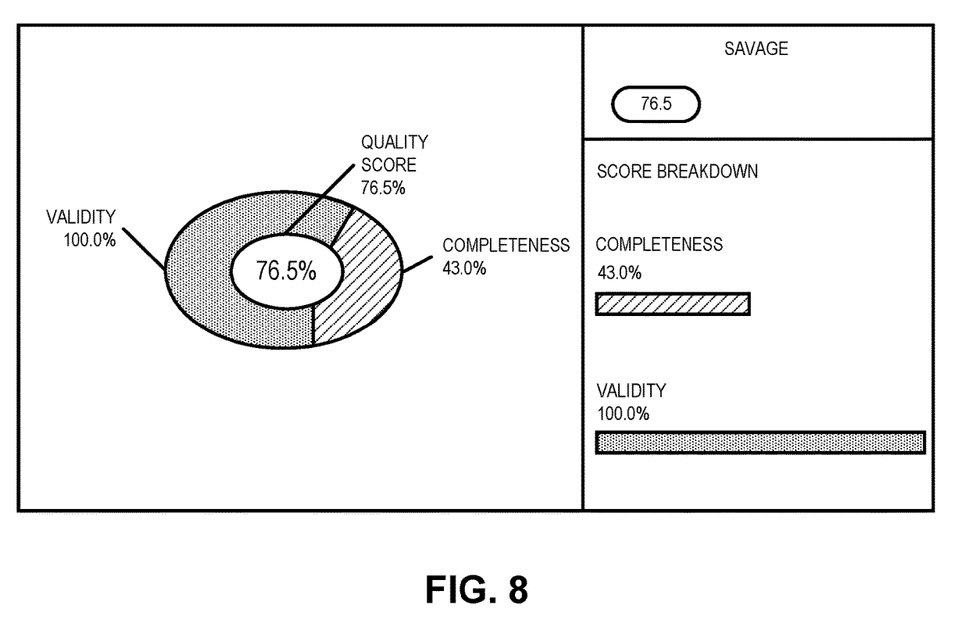
FIG. 8 shows an example display illustrating data quality score output produced by a generic rule engine configured in a data ecosystem admin application with multiple rule categories according to an embodiment.

Embodiments of the generic rules engine 200 may have an extended capability of accepting varieties of rule categories. Inside the generated results, a capability exists to permit drilling down to the details of each category, its rule, and then to its associated calculated score. FIG. 8 shows an example display that may be generated by the generic rule engine 200, which may be configured in a data ecosystem admin application with multiple rule categories. As shown in the example of FIG. 8, the multiple categories may include quality score, completeness, and validity. In other embodiments, the multiple categories may be different. FIG. 8 shows a quality score of 76.5%, a validity score of 100.0%, and a completeness score of 43.0%. A user may drill down on any of the multiple categories by selecting one of the multiple categories via a pointing device, a finger on a touchscreen, or via other methods. Upon making a selection of one of the categories, more details of the selected category may be displayed.

Embodiments of the generic rules engine 200 can be configured for any type of information technology system where quality measures are desired. Because of its general plug-and-play architecture, the generic rules engine 200 may allow zero configurations for datatypes, and may save effort in maintaining the generic rules engine 200 as newer datatypes are introduced into digital systems over time. Intelligence introduced into the generic rules engine 200 for finding compatible schemas provide significant cost savings over time. Further, the generic rules engine 200 can be applied at any stage of a data lifecycle.

The foregoing description, for purposes of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method comprising:
receiving, by a rules engine executing on a processing device, a definition of one or more rules in a JavaScript Object Notation (JSON) format;
ingesting, by the rules engine, data during run time, wherein the data comprises data associated with at least one of: a wellbore, a simulated wellbore, drilling operations of the wellbore, simulated drilling operations of the wellbore, simulated drilling operations of the simulated wellbore, or a geological environment;
responsive to determining, by the rules engine, that a structure of the ingested data is unknown to the rules engine:
obtaining, from a schema service executing on the processing device during the run time, a preregistered schema corresponding to the structure of the ingested data;
generating a .java file during the run time based on the preregistered schema;
generating a .class file during the run time based on the java file;
generating, by the rules engine, a .drl file during the run time based on the .class file and the one or more rules; and
updating, by the processing device, a context of the rules engine based on the generated .drl file to configure the rules engine to run the one or more rules with the structure of the ingested data;
determining, by the rules engine, based on the updated context, whether the ingested data of the structure conforms to the one or more rules; and
outputting, by the rules engine, a data quality score based on rules of the one or more rules to which the ingested data conforms.

2. The method of claim 1, wherein:
the ingested data includes a property of wellName; and
one of the one or more rules is a user-defined rule that checks for a condition in which a value of the wellName is not equal to a null value.

3. The method of claim 1, wherein the obtaining the preregistered schema corresponding to the structure of the ingested data further comprises:
interfacing, during the run time, the schema service with a repository including all pre-registered schemas to obtain the preregistered schema that is unknown to the rules engine.

4. The method of claim 1, wherein:
the ingested data comprises a well record; and
the outputting the data quality score comprises automatically outputting a data quality score for each new well record ingested into a data ecosystem.

5. The method of claim 1, further comprising:
storing the data quality score in a data ecosystem;
invoking, by the rules engine, a search application program interface for the data ecosystem responsive to receiving a search query for the data quality score; and
receiving, by the rules engine from the data ecosystem, the data quality score and records associated with the search query responsive to the invoking of the search application program interface.

6. A computing system comprising:
at least one processor; and
a memory connected with the at least one processor, wherein the memory includes instructions to configure the computing system to perform operations, the operations comprising:
receiving, by a rules engine executing on the computing system, a definition of one or more rules in a JavaScript Object Notation (JSON) format;
ingesting, by the rules engine, data during run time, wherein the data comprises data associated with at least one of: a wellbore, a simulated wellbore, drilling operations of the wellbore, simulated drilling operations of the wellbore, simulated drilling operations of the simulated wellbore, or a geological environment;

responsive to determining, by the rules engine, that a structure of the ingested data is unknown to the rules engine:
  obtaining, from a schema service executing on the computing system during the run time, a preregistered schema corresponding to the structure of the ingested data;
  generating a java file during the run time based on the preregistered schema;
  generating a .class file during the run time based on the java file;
  generating, by the rules engine, a .drl file during the run time based on the .class file and the one or more rules; and
  updating, by the computing system, a context of the rules engine based on the generated .drl file to configure the rules engine to run the one or more rules with the structure of the ingested data;
determining, by the rules engine, based on the updated context, whether the ingested data of the structure conforms to the one or more rules; and
outputting, by the rules engine, a data quality score based on rules of the one or more rules to which the ingested data conforms.

7. The computing system of claim 6, wherein the operations further comprise receiving, by the rules engine, a definition of a rule in a format that is understandable to a human.

8. The computing system of claim 6, wherein the obtaining the preregistered schema corresponding to the structure of the ingested data further comprises:
  interfacing, during the run time, the schema service with a repository including all pre-registered schemas to obtain the preregistered schema that is unknown to the rules engine.

9. The computing system of claim 6, wherein:
the ingested data comprises a well record; and
the outputting the data quality score comprises automatically outputting a data quality score for each new well record ingested into a data ecosystem.

10. The computing system of claim 6, wherein the operations further comprise:
  storing the data quality score in a data ecosystem;
  invoking, by the rules engine, a search application program interface for the data ecosystem responsive to receiving a search query for the data quality score; and
  receiving, by the rules engine from the data ecosystem, the data quality score and records associated with the search query responsive to the invoking of the search application program interface.

11. The computing system of claim 6, wherein:
the ingested data includes a property of wellName; and
one of the one or more rules is a user-defined rule that checks for a condition in which a value of the wellName is not equal to a null value.

12. A non-transitory computer-readable storage medium having instructions stored thereon for configuring a computing device to perform operations, the operations comprising:
  receiving, by a rules engine executing on the computing device, a definition of one or more rules in a JavaScript Object Notation (JSON) format;
  ingesting, by the rules engine, data during run time, wherein the data comprises data associated with at least one of: a wellbore, a simulated wellbore, drilling operations of the wellbore, simulated drilling operations of the wellbore, simulated drilling operations of the simulated wellbore, or a geological environment;
  responsive to determining, by the rules engine, that a structure of the ingested data is unknown to the rules engine:
    obtaining, from a schema service executing on the computing device during the run time, a preregistered schema corresponding to the structure of the ingested data;
    generating a java file during the run time based on the preregistered schema;
    generating a .class file during the run time based on the java file;
    generating, by the rules engine, a .drl file during the run time based on the .class file and the one or more rules; and
    updating, by the computing device, a context of the rules engine based on the generated .drl file to make the rules engine capable of running the one or more rules with the structure;
  determining, by the rules engine, based on the updated context, whether the ingested data of the structure conforms to the one or more rules; and
  outputting, by the rules engine, a data quality score based on rules of the one or more rules to which the ingested data conforms.

13. The non-transitory computer-readable storage medium of claim 12, wherein the obtaining the preregistered schema corresponding to the structure of the ingested data further comprises:
  interfacing, during the run time, the schema service with a repository including all pre-registered schemas to obtain the preregistered schema that is unknown to the rules engine.

14. The non-transitory computer-readable storage medium of claim 12, wherein:
the ingested data comprises a well record; and
the outputting the data quality score comprises automatically outputting a data quality score for each new record ingested into a data ecosystem.

15. The non-transitory computer-readable storage medium of claim 12, wherein the operations further comprise:
  storing the data quality score in a data ecosystem;
  invoking, by the rules engine, a search application program interface for the data ecosystem responsive to receiving a search query for the data quality score; and
  receiving, by the rules engine from the data ecosystem, the data quality score and records associated with the search query responsive to the invoking of the search application program interface.

16. The non-transitory computer-readable storage medium of claim 12, wherein:
the ingested data includes a property of wellName; and
one of the one or more rules is a user-defined rule that checks for a condition in which a value of the wellName is not equal to a null value.

\* \* \* \* \*